Feb. 3, 1959      L. R. GRAVES ET AL      2,871,756
MECHANO-OPTICAL METHOD FOR INSPECTING TRANSPARENT
FLAT OR CONTOURED PANELS
Filed Dec. 28, 1953      5 Sheets-Sheet 1

INVENTORS
Loinel R. Graves
James E. Knapp
Antone M. Guerreiro
Clair A. Cable
Robert C. Wheeler Their Patent Attorneys

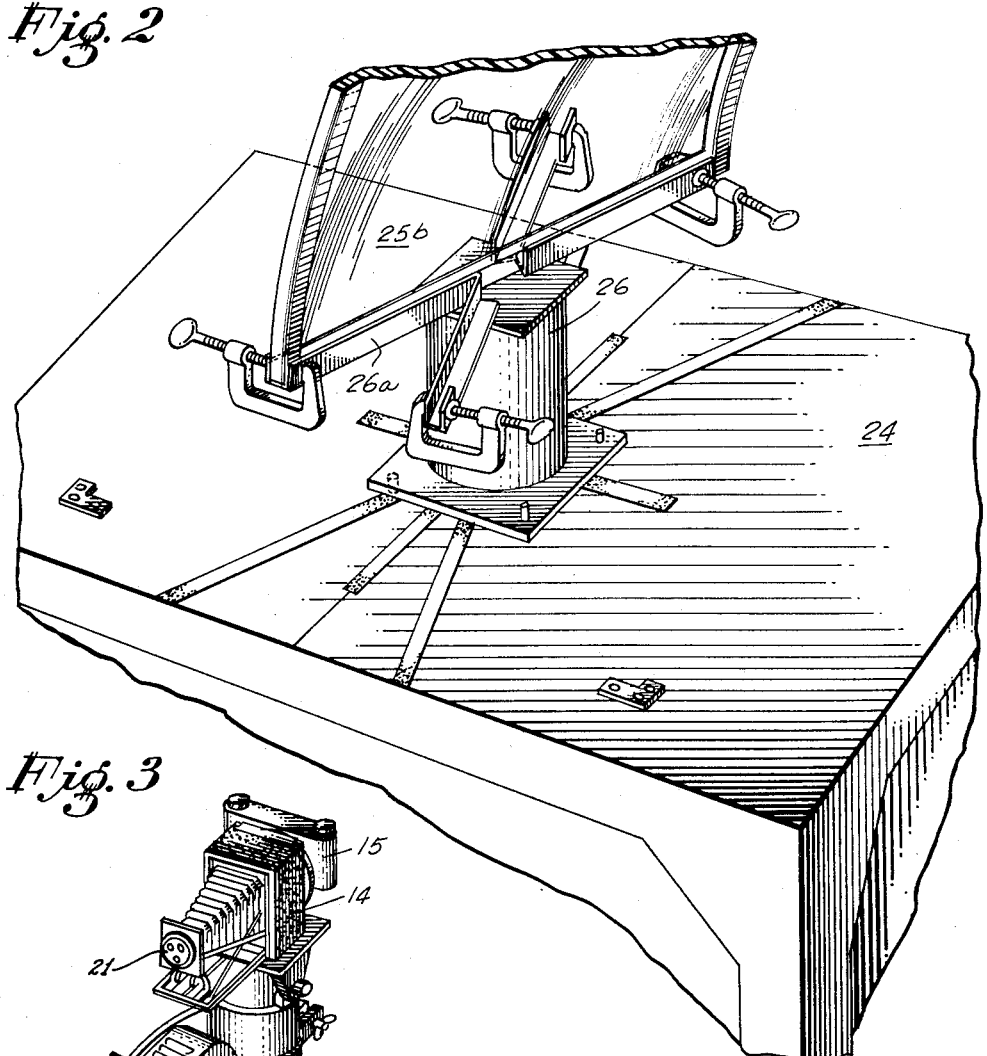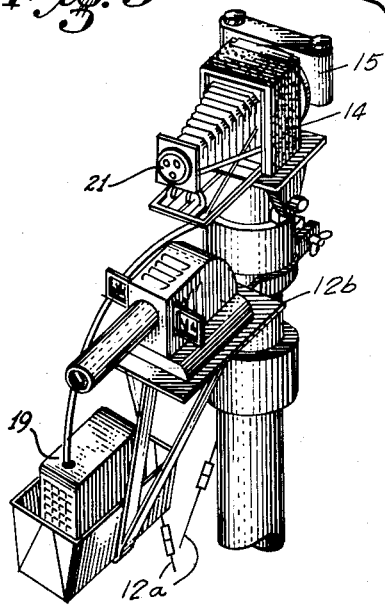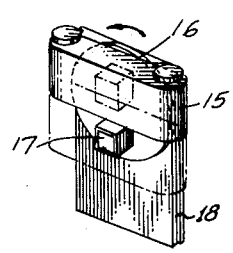

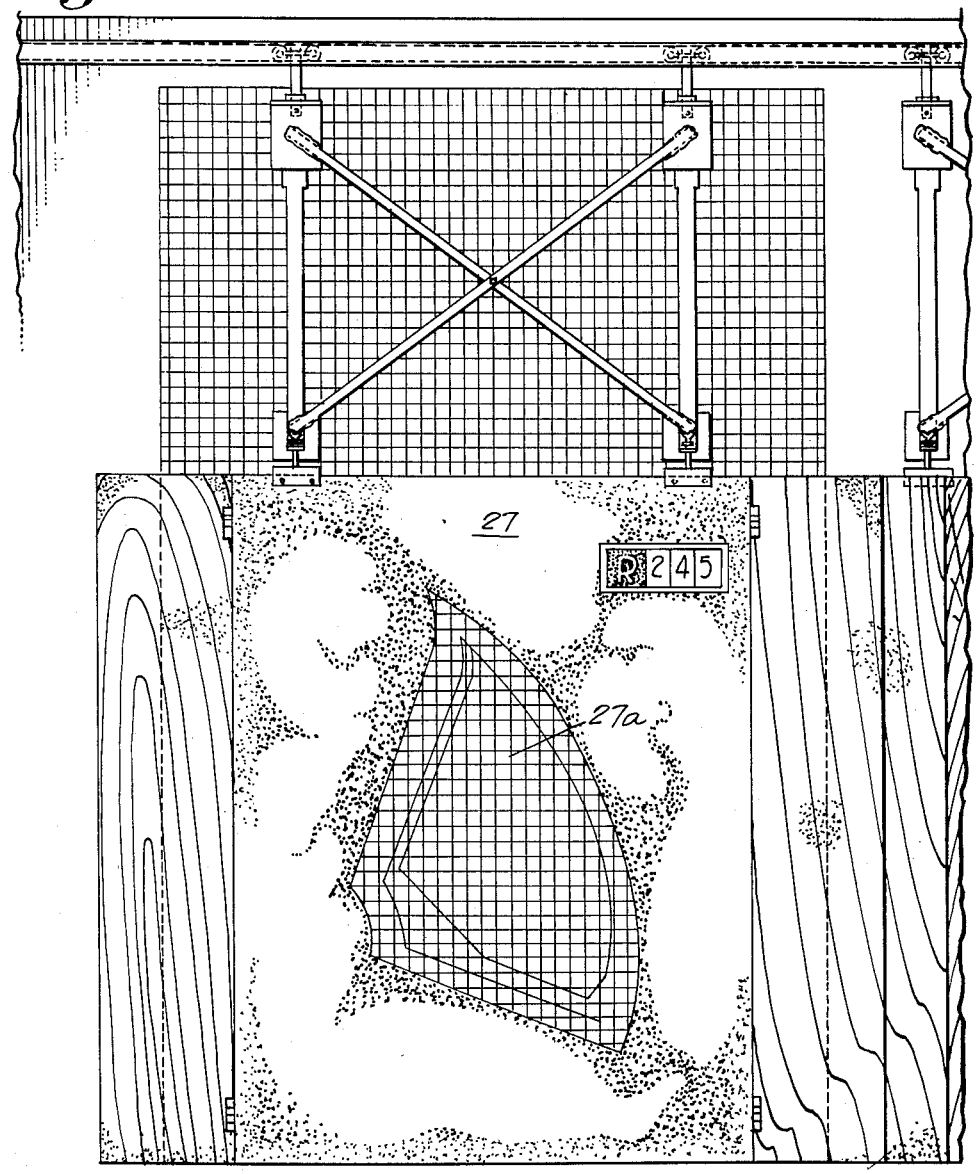
Fig. 7
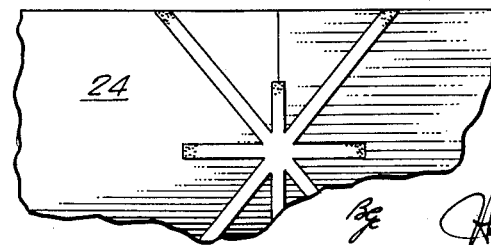
INVENTORS:
Loinel R. Graves
James E. Knapp
Antone M. Guerreiro
Clair A. Cable
Robert C. Wheeler
Their Patent Attorney

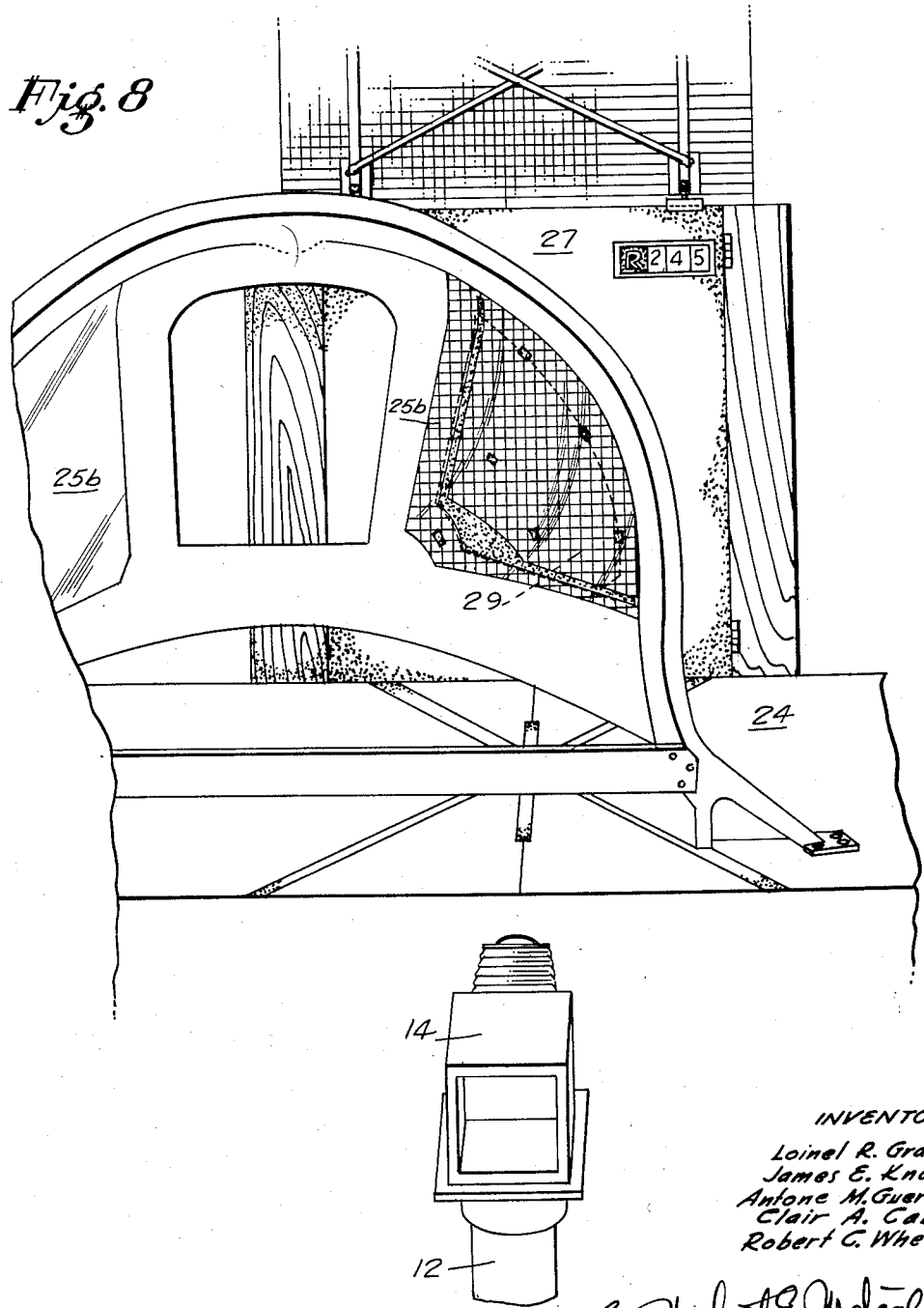

United States Patent Office 2,871,756
Patented Feb. 3, 1959

2,871,756

MECHANO-OPTICAL METHOD FOR INSPECTING TRANSPARENT FLAT OR CONTOURED PANELS

Loinel R. Graves, Hollywood, James E. Knapp, South Gate, Antone M. Guerreiro, Long Beach, Clair A. Cable, El Segundo, and Robert C. Wheeler, Playa Del Rey, Calif., assignors to Northrop Aircraft, Inc., Hawthorne, Calif., a corporation of California Application December 28, 1953, Serial No. 400,436

9 Claims. (Cl. 88—14)

This invention relates to a method and means for testing the optical quality of the transparent windshield or windshield panels of vehicles such as airplanes, during fabrication and after final assembly in the windshields.

The invention is particularly designed to carry out testing of transparent panels set at relatively sharp angles to a longitudinal axis and in addition which may possibly be curved in both horizontal and vertical directions. Such panels are usually formed from transparent plastic sheets since this material may be readily formed to the compound curvatures required, but the material is subject to stresses in both formation of the sheet material and in the later assembling of the windshields, which stresses may so impair the optical quality of the panels in various areas as to render the panel unfit for use unless the conditions are detected by inspection and the defects corrected.

Much work has been done by the fabricators of airplane windshields, particularly those of small size such as are fitted to high speed planes, in an attempt to develop inspection procedures adapted to mass production methods, which necessitate rapid but accurate routines preferably operable by the average skilled worker and which eliminates the personal equation to as large a degree as possible.

The complexity of the problems to be met will be apparent from a brief consideration of the defects in uniform transparency which may arise in producing panels of the kind described from transparent plastic material, which in the illustrative example later given is an acrylic resin.

The material is made by pouring a liquid between two highly surfaced plates (usually glass) of any desired size, shapes, or thickness. Owing to unequal cooling of the material, uneven flow into the mold, and other causes, the resulting sheet of material has areas of different optical characteristics.

The forming of the panels to the required curvatures may give rise to a second pattern of stresses, and finally the cutting to accurate shape and mounting of the panels in the metal frame of the windshield may cause still further stresses.

It will be evident that inspection should be made at a number of points during fabrication in order to prevent the building up of defects in the various stages of manufacture, which defects in total sum might render the windshields unfit for use since it might be impossible to rectify the defects in the completed windshield.

It is therefore the general object of the invention to provide a method of inspection and appropriate equipment for the practice thereof capable of use in mass production techniques, which has proved in practice to produce practically uniformly acceptable windshield assemblies.

It is a specific object of the invention to provide a method for the purpose described, in which both the raw sheet stock from which the windshield panels are fabricated is inspected before the material is accepted as satisfactory for use, and a later step by step inspection through fabrication in which the panels are individually inspected for optical quality at the angle at which the pilot normally looks through the panels.

Another specific object of the invention is to provide a method of inspection in which windshield transparent panels are inspected for optical defects after each production procedure which might introduce stresses affecting the optical quality of the panels.

Still another object of the invention is to provide a final step for removing or minimizing any slight residual-mechanical or inherent stresses remaining in the panels after installation in a windshield.

A further object of the invention is to provide equipment arranged so that operators may carry out the various steps of the method with absolute uniformity with respect to successive panels without loss of time and possibility of error due to faulty adjustments of equipment.

Another object of the invention is to provide an expeditious method for checking the accuracy of the tooling used in fabricating the panels, to correct repair work, and to assure additional tooling which coincides with that already in existence.

In the accompanying drawings:

Figure 2 is a fragmentary detail view in perspective of means for holding a transparent panel in position for inspection drawn on a larger scale.

Figure 3 is a detail perspective view of camera and light projector means viewed from the opposite direction to that in Figure 1 and drawn on a larger scale.

Figure 4 is a detail view in perspective showing a special back fitted to the camera shown in Figure 3.

Figure 7 is a front elevational view drawn on a larger scale.

Figure 8 is a fragmentary elevation showing a windshield with panels mounted therein, the right hand panel undergoing inspection.

The manner of carrying out the method of the invention will be described under headings making clear the succession of steps in the method. It is to be noted that deviations in the optical qualities of areas of the panels from acceptacle standards are found at each stage and remedial action taken so that no build-up of errors can occur.

Figure 1:
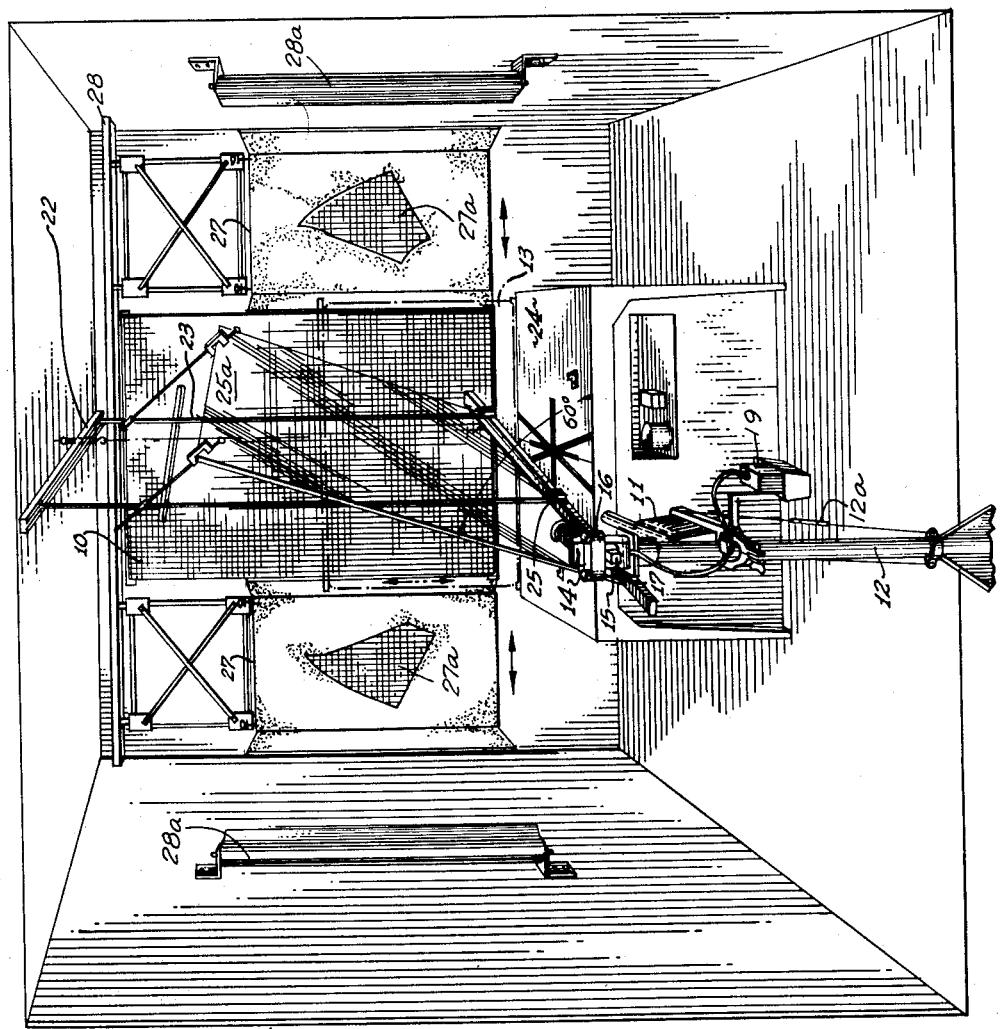
Figure 1 is a perspective view of a dark room showing the arrangement of the apparatus for carrying out the invention.

The various articles of equipment or apparatus used in the complete testing method, not necessarily all in combination in each step of the method, comprise:

No. 1.—A stationary wall grid 10, Figure 1, with fine grid lines thereon centered one inch apart, the lines of the grid and background being in strongly contrasting colors, for instance white and black.

No. 2.—Movable side grids 27, Figure 1, mounted one on each side of the wall grid and provided with means for adjusting them vertically and horizontally and with the projected shadow outline 27a of a side panel outlined on each together with an outline of various areas each having a predetermined maximum amount of distortion. The movable side grids are hung from tracks 28 (Figure 1) and can be brought into position against the front face of the wall grid.

No. 3.—A projector 11, Figure 1, mounted on a shelf adjustable on a rigid vertical column 12 spaced from the wall grid at whatever distance is necessary for proper magnification in the particular embodiment × 64, and a projection lantern slide, made by photographing the wall grid, the photographic image showing the grid lines spaced 1/64 inch apart on the slide. This slide is used in some steps of the method using the projector. A roll-up white projection screen 13 which is 50 x 50 inches is mounted so that it may be pulled up over the grid for use in certain steps of the method.

No. 4.—A 35 mm. camera 14, Figure 1, mounted on the same column as the projector, and fitted with a rotatable back 15 carrying a film holder 16, adjustable to bring into position either the film container 16 or a ground glass focusing screen 17. The rotatable back is mounted on a frame 18 (Figure 4) adapted to be slid into the grooves provided to mount a film pack adapter on the camera body.

Figure 5:
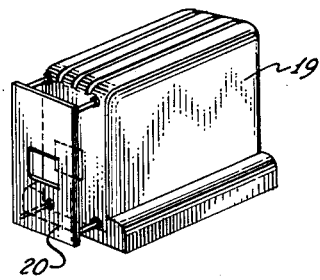
Figure 5 is a detail view in perspective of a light projector shown in Figure 3 and drawn on a larger scale.

A light box fitting 19 (Figure 5) for use on the camera is provided comprising a light source and a lens for collimating the emitted light to evenly illuminate a 2" x 2" aperture or equivalent opening mounted in the film position on a plate 20 (Figure 5) on which the light box is mounted, the plate being slid into the usual grooves provided to mount a film pack adapter on the camera body. A three hole lens mask 21 (Figure 3) can be mounted over the camera lens.

No. 5.—An overhead track 22, Figure 1, running across the optical axis of the camera and projector at a 23° angle, which is the angle with respect to the longitudinal axis at which the side panels of the particular windshield described by way of example, are set, the angle will of course correspond to the particular angular setting of the side panels in different windshield designs. A rack 23 is supported from trolleys rolling along the track.

No. 6.—A table 24, 4 x 6 feet, marked with scribed lines and doweled for guides and clamps, and a removable bar 25, Figure 1, located on the table and at the same angle on the overhead track. A sheet 25a supported at its upper edges from the tie bar on the rack and with the lower edges in the suspended rack and the rack in turn against the positioning edge of the guide bar, will be supported at a predetermined angle (for example, 60° vertically) and relative to the marking on the table, this vertical angle being that at which the windshield panels are mounted, said angle being that of the line of sight of a person viewing through the panel in normal use. A center fixture or clamp 26 (Figure 2) is provided with a panel holding fixture 26a and is fitted removably on the table for holding cutout transparent panels at the required angles in vertical and horizontal direction. The table center is placed at 9 feet from the wall grid, or at such distance to provide proper magnification for marking the particular panels to be inspected to coincide with markings on the wall mounted grids provided with corresponding markings.

Figure 6:
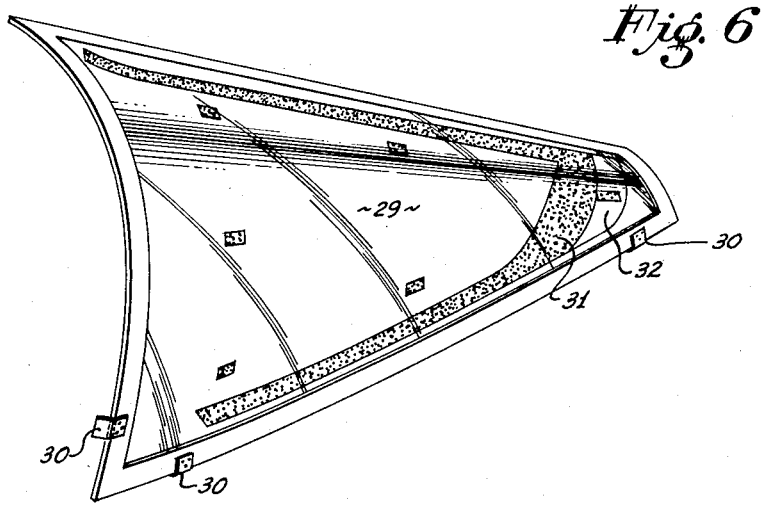
Figure 6 is a perspective view of a transparent detachable inlay member marked to indicate marginal areas having different permissible defects in transparency.

No. 7.—Two transparent overlays 29, Figure 6, cut and formed to windshield panel form and shape and provided with clips 30 by which they may be accurately located over the panels. Various areas are outlined on the overlays preferably in color as indicated at 31 and 32, indicating areas having different permissible degrees of distortion.

The method of the invention comprises the following steps:

Step 1.—A sheet of transparent plastic 25a, generally 36 x 72 inches, is cleaned and suspended from the overhead rack above the table, at the vertical and horizontal angles corresponding to that of the line of sight of a person seated behind the windshield, which in a particular instance is a vertical 60° angle to a horizontal plane and an angle 23° transverse to a straight ahead line of vision through the windshield. The lower edge of the rack is rolled along guide bar 25 on the table. The sheet is moved at a 23° angle across the optical axis of the projector intersecting it 7 feet from the permanently mounted grid which affords suitable magnification of the projected image on the markings on the permanent or wall grid.

The projector slide of the grid is placed in the projector, its distance from the wall grid being 16.5 feet, or whatever distance necessary for suitable magnification, to effect accurate coincidence of a projected image on the wall grid, and the grid image is projected through the plastic sheet upon the grid; any deviation of the projected lines of more than a predetermined maximum, as required for the particular transparency to be inspected, for instance 1/3 of a square for a distance of more than 6 squares, is cause for rejection of the whole sheet if less than a specified number of satisfactory panels, for instance three, may be cut from the sheet. The outline of satisfactory areas are marked on the sheet while under the projected light inspection and the panels cut to remove defective areas and thereby provide panels hereafter referred to as cutout panels. These cutout panels are further cut or trimmed and subsequently formed to a desired shape by the application of heat and pressure to provide a formed windshield panel 25b.

Step 2.—The roughly sized, formed windshield panel 25b is inspected to determine whether any induced distortion is present. The grid slide is positioned in the projector, the projector lamp is turned on and the lines of the projected grid aligned exactly with the lines of the wall grid, by adjusting turnbuckles 12a supporting the projector table 12b (Figure 3).

The panel is then placed in the holding fixture 26a of the clamp 26 on the table at the point at which the sheet of plastic was examined and any distortion of the grid as projected therethrough is observed and evaluated, and if more than of a specified maximum amount, the panel is reformed.

Step 3.—Satisfactory panels are then machined, bonded, etc. and mounted in position in a windshield frame and annealed for instance at about 189° F. for about six and three-quarter hours followed by a cooling period of about forty-five minutes, to remove slight distortions due to stresses imposed in fitting the panels into the windshield frame. After each one of these operations the panels may be inspected to evaluate and correct any stresses mechanically incurred. The panels installed in a windshield are then inspected, first one panel and then the other to determine distortion, if any, in specified zones or areas having permissible distortion of different maximum amounts, it being understood that the procedure below described is used for each panel.

The overlays 29 are then clipped in position on the panels. The camera mounted on the rigid support is utilized to first project a light beam through the overlays, to effect which the rotatable back is removed and the light box positioned on the camera back.

The windshield assembly is positioned on the table so as to bring the first side panel into a line at 23° to the optical axis.

The lens aperture is adjusted to give maximum definition of the overlay shadows on the adjustable side grids 27 which are brought into position in front of the permanent wall grid and are adjusted both vertically and horizontally to bring the panel outlines 27a thereon into registration with the projected panel outlines. Some very slight discrepancy is usually present in each windshield panel from the panels last tested owing to minor inaccuracies in fabrication.

Step 4.—The overlays 29 and panel areas 27a having been brought into alignment, a photograph is then taken to provide a permanent record. To do this the overlays are removed, the light box 19 is removed from the camera back, and the rotatable back 15 is inserted to bring the ground glass viewing screen 17 into the optical axis of the lens, wall lights 28a illuminating the grid are turned on and the camera lens brought to maximum sharpness of focus while observing the ground glass screen.

A photograph through the side panel is then taken which will show the various areas, each of which is designated by a distinctive mark, using a light beam splitting device, which as shown is a lens cap having three apertures therein having for their purpose, as will be understood by those familiar with the use of apertured discs in optical testing, to provide three superimposed images from light rays that have traveled through different paths in the lens to the film. Step procedures Nos. 3 and 4 are repeated to photograph the opposite panel at a 23° angle.

After development the negative is cut and mounted, then placed in the projector, the projector screen 13 is pulled up and an image of the completed panel is projected. As all the lines in the grid are straight, if no distortion was caused by the material of the panels in the path of the rays therethrough, all lines of the superposed images would be parallel in the projected image, but any distortion would be at once apparent as blurred single or double or triple lines. The projection of the photographs directly upon the screen enables the distortions, if any, in the installed panels to be analyzed and their locality established. A careful evaluation of any and all distortions will enable a decision to be made as to whether the defects in a panel can be removed or whether the panel or panels should be discarded.

Discussion of equipment and method

It will be noted that the method of this invention provides for the inspection of the optical quality of windshield panels from the raw material as a first step, and at two intermediate stages of production, ending with a final inspection of the windshield panels assembled in the windshield frame, and the making of a photographic record of the panels of the assembled windshield which shows the different areas of the panels having different allowable limits of distortion. All checking is carried out on the line of sight of the pilot through each panel and is therefore an accurate test of the panels as actually used.

Although the procedure described might appear time consuming, in actual fact, it is not. All equipment used is either permanently located, or easily positioned on equipment in certain steps. Such equipment can be removed and replaced very quickly in permanently located positions as for instance by dowel and socket connections, and the method takes no longer to carry out than the less thorough methods formerly employed.

The method is readily carried out by personnel of average skill and produces results uniformly better than any others of which we have knowledge.

A decisive element in the success of the method is the novel arrangement of some of the equipment utilized since it enables the various steps to be carried out with speed, accuracy, and uniformity.

Such equipment includes the fixed table with a top having marked center line, lines intersecting said center line and having dowels and sockets in the surface to locate holding and guiding means at predetermined positions thereon, and an overhead track in a plane at the same angle as said intersecting lines with a straight edge held on the table top parallel to said plane; the adjustable side grids having the contour of the panels outlined thereon and of the areas thereof having different allowable limits of distortion also marked; the transparent overlays having clips enabling them to be positioned on the panels and having areas of different allowable distortion marked thereon; and the mounting of a camera having a removable back, constructed so that either a focusing screen or a film carrier may be rotated into the optical axis of the camera. Light splitting means are in addition fitted to the camera, and a light box is adapted to be at times mounted on the camera back to enable the camera to be used as a projector in certain steps of the method of this invention.

The camera and projector are mounted on the same stand and all positions in which the equipment is used is permanently determined, so that an operator can perform the sequence of steps of the method with absolute uniformity with successive panels tested and can perform them with a maximum of speed and accuracy.

It will be evident that the method of inspection of windshield panels as herein specifically described, as well as apparatus employed therein, may be modified in various ways by those skilled in the art without departing from the scope of the invention as defined by the appended claims.

What is claimed is:

1. The method of transparent panel inspection comprising: photographing a wall grid having the lines of the grid spaced well apart, supporting a sheet of transparent material from which windshield panels are to be formed at an angle to a horizontal plane and to the longitudinal axis of the beam projected from a projector upon said wall grid, said angles corresponding to those at which the panel is mounted in the windshield in which it is to be incorporated, thus reproducing the angle of an observer's average line of sight when seated in position in a vehicle in which the windshield is fitted, projecting said photograph upon said wall grid to accurately align the projected lines of the photograph upon the lines of the grid and moving the sheet of transparent material while supported in said angular positions across the projected beam and marking upon said sheet any areas causing distortion of the lines of the projected photograph.

2. The method of transparent windshield panel inspection as set forth in claim 1 and in addition comprising: examining the material of the panel at various stages of the fabrication thereof and at which stages optical deficiencies might be present, all such examinations being carried out with the material of the panels supported at an angle to a horizontal plane and to the optical axis of optical apparatus used to effect such inspection, said angles being similar to the angles at which the panels are mounted with respect to the line of sight of an observer seated in position in the vehicle behind said windshield.

3. The method of inspecting the optical quality of transparent panels comprising: preparing a projector slide of a wall grid which is defined by lines which are spaced well apart, supporting a sheet of transparent material from which a formed transparent panel is to be fabricated at an angle to a horizontal plane and to the londitudinal axis of the beam projected from a projector upon said wall grid, said angles corresponding to those at which the formed panel is to be mounted in a windshield assembly or the like, thus reproducing the angle of an observer's average line of sight when seated in a normal position in said assembly, projecting the grid processed on said projector slide on said wall grid to accurately align the grid lines on said projector slide with the lines of the wall grid and moving the sheet of transparent material while supported in said angular positions across the projected beam and marking upon said sheet any areas causing distortion of the lines of the projected grid on said wall grid; removing defective areas of said sheet and thereby providing at least one cutout panel which exhibits minimum distortion; forming said cutout panel to correct curvature by the use of heat and pressure to provide a formed panel; projecting the grid processed on said projector slide into exact alignment with the wall grid; supporting said formed panel at the angles at which the sheet of material was inspected in the path of the rays from the projector to the wall grid; mounting said formed panel in a windshield frame to provide a windshield assembly; projecting a light through said formed panel, while maintaining said formed panel at an angle to the axis of the projected light and a vertical angle relative to a horizontal plane, said angles being those of the line of sight of a person, projected through the formed panel onto said wall grid, upon a side grid having an accurate outline of the formed panel and zones thereof marked thereon and bringing said side grid into accurate alignment with the projected grid image; taking a photograph through said formed panel by means affording a number of superposed images on the light sensitive surface in the camera; preparing a projector slide from the developed negative; and projecting said slide upon a plain background to evaluate distortions evidenced by any lack of exact registration of the grid lines in the projected image.

4. The method of inspecting the optical quality of transparent panels comprising: preparing a projector slide of a wall grid which is defined by lines which are spaced well apart, supporting a sheet of transparent material from which a formed panel is to be constructed at an angle to a horizontal plane and to the longitudinal axis of the beam projected from a projector upon said wall grid, said angles corresponding to those at which the formed panel is to be mounted in an assembly, thus reproducing the angle of an observer's average line of sight when seated in a normal position in said assembly, projecting the grid processed on said projector slide on said wall grid to accurately align the grid lines processed on said projector slide with the lines of the wall grid and moving the sheet of transparent material while supported in said angular positions across the projected beam and marking upon said sheet any areas causing distortion of the lines of the projected grid processed on said projector plate; removing defective areas of said sheet and thereby providing at least one cutout panel which exhibits minimum distortion; forming said cutout panel to correct curvature by the use of heat and pressure to provide a formed panel; projecting the grid on said projector slide on the wall grid into exact alignment with the wall grid; supporting the formed panel at the angles at which the sheet of material was inspected in the path of the rays from the projector to the wall grid; mounting said formed panel in a frame to provide an assembly; annealing said formed panel and frame; clipping transparent overlays, marked with zones having different permissible distortion, onto said formed transparent panel; projecting a light through said formed panel, while maintaining said formed panel at an angle to the axis of the projected light and a vertical angle relative to a horizontal plane, said angles being those of the line of sight of a person projected through the cutout panel onto grids, upon a side grid having an accurate outline of the formed panel and zones thereof marked thereon and bringing said side grid into accurate alignment with the projected image of the formed panel; removing the overlays; taking a photograph through the formed panel by means affording a number of superposed images on the light sensitive surface in the camera; preparing a projector slide from the developed negative; and projecting said slide upon a plain background to evaluate distortions evidenced by any lack of exact registration of the grid lines in the projected image.

5. Apparatus for optically inspecting transparent panels in a succession of steps from raw material to installed panel, comprising: a fixed grid mounted in a vertical position; a movable grid arranged at each side of and movable into position to lie against the front of said fixed grid; elevated track means mounted to lie in a plane normal to and above the fixed grid and to extend at a predetermined angle to said fixed grid; transparent sheet supporting means movable along said track to move the transparent sheet across and in front of the fixed grid; means maintaining said transparent sheet at a predetermined vertical angle while moving along said track; a vertical support arranged at a predetermined distance from, and in front of said fixed grid and path of movement along said track of a transparent sheet; and a camera and a projector arranged on said vertical support whereby a grid image may be projected from said projector through a transparent panel positioned in said movable means and onto said fixed grid.

6. Apparatus for optically inspecting transparent panels for optical quality in a succession of steps from raw material to shaped and installed panel comprising in combination: a dark room; a grid on a wall of said dark room; a table standing on the floor of said dark room having its top surface marked with intersecting lines at predetermined equal angles thereon with respect to a line normal to the center of said wall grid and positioned at a fixed predetermined distance in front of said grid; a vertical mounting member positioned in alignment with said lines normal to the center of the wall grid and in front of said table and grid; an overhead rail extending parallel to one of said intersecting lines; an elongated guide member mounted on said top surface and located thereon parallel to the vertical plane of said overhead track; a movable member supported on said overhead track and provided with means for holding the upper edge of a sheet of plastic material while enabling it to be moved along said overhead track with its lower edge guided by sliding along said elongated guiding member; an optical inspection means mounted on said support whereby a grid image may be projected from said projector through a transparent panel positioned in said guiding member and said means for holding the upper edge of a sheet of plastic material and onto said grid.

7. Apparatus as set forth in claim 6 and in addition comprising: elevated supporting means; side wall grids movably mounted on said elevated supporting means on each side of said wall grid so that first one and then the other side grid may be positioned in front of and lying against said wall grid, said side wall grids being marked to show the outline of the panels, and of areas thereof having different limits of distortion.

8. Apparatus as set forth in claim 6 and in addition comprising means for adjusting said grids with respect to the supporting means on which they are mounted.

9. Apparatus for optically inspecting transparent panels in a succession of steps from raw material to installed panel, comprising: a fixed grid positioned on a wall; a movable grid arranged at each side of said wall grid; elevated track means mounted to lie in a plane normal to the fixed grid and to extend at a predetermined angle to said fixed grid; transparent sheet supporting means movable along said track; means maintaining a sheet of transparent material at a predetermined vertical angle while moving along said track; a camera mounted on said vertical support; a removable back plate for said camera; a film holder and a ground glass viewer rotatably mounted on said back plate so that either the film holder or ground glass viewer may be rotated into the optical axis of the camera; and a light box adapted to be substituted for the back plate of said camera at times whereby a grid image may be projected through said sheet and onto said fixed grid.

References Cited in the file of this patent

UNITED STATES PATENTS

| | | |
|---|---|---|
| 1,590,532 | Lenouvel | June 29, 1926 |
| 1,798,573 | Wright | Mar. 31, 1931 |
| 2,247,047 | Bishop | June 24, 1941 |
| 2,379,263 | Vine | June 26, 1945 |
| 2,418,489 | Tillyer | Apr. 8, 1947 |
| 2,610,445 | Liberatore | Sept. 16, 1952 |

OTHER REFERENCES

"A Chart Method of Testing Photographic Lenses," L. E. Jewell, Journal of the Optical Society of America, vol. 2–3, pages 51–61, November 1919.